April 27, 1943.　　　A. F. WILD　　　2,317,840
REFRIGERATING APPARATUS
Filed Aug. 23, 1941　　　2 Sheets-Sheet 1

Inventor:
Albert F. Wild,
by Harry E. Dunham
His Attorney.

April 27, 1943.     A. F. WILD     2,317,840
REFRIGERATING APPARATUS
Filed Aug. 23, 1941     2 Sheets-Sheet 2
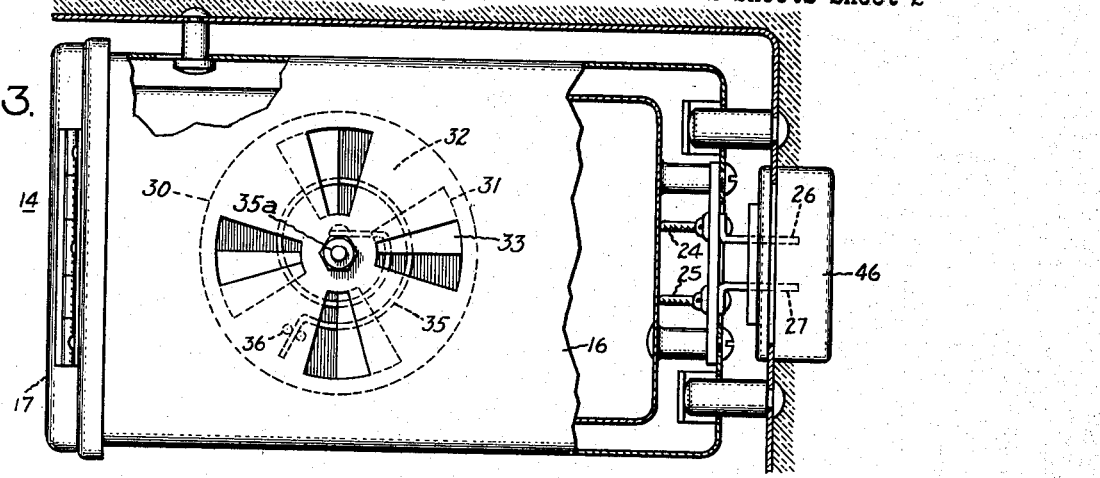
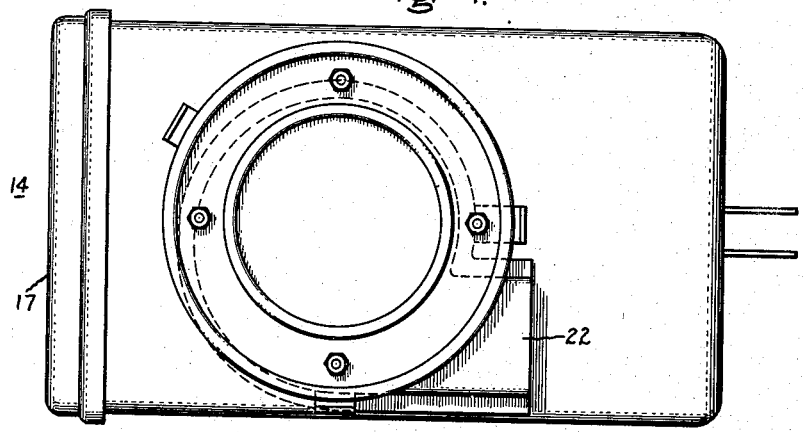
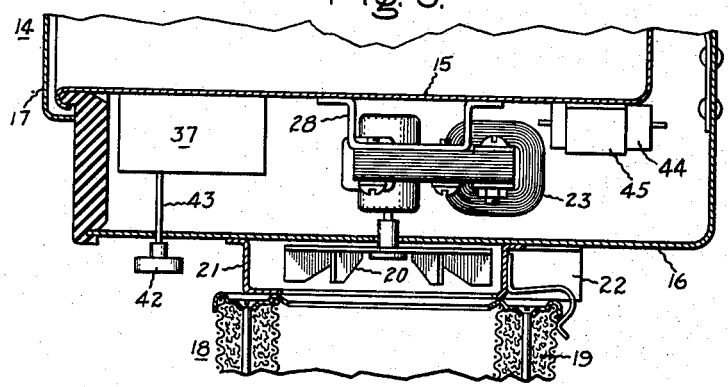
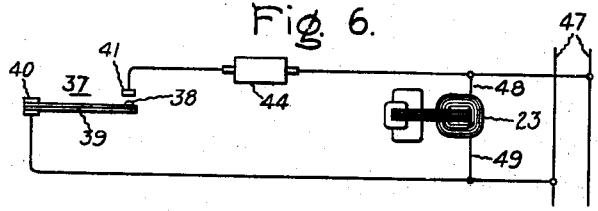
Inventor:
Albert F. Wild,
by Harry E. Dunham
His Attorney.

Patented Apr. 27, 1943

2,317,840

UNITED STATES PATENT OFFICE 2,317,840

REFRIGERATION APPARATUS

Albert F. Wild, Erie, Pa., assignor to General Electric Company, a corporation of New York Application August 23, 1941, Serial No. 408,010

6 Claims. (Cl. 62—89)

My invention relates to refrigeration apparatus and more particularly to refrigerator cabinets of the domestic type.

In household refrigerators, receptacles have been provided for the storage of butter and the like at temperatures above that generally prevailing in the refrigerated compartment of the cabinet in order to maintain the butter or the like at a consistency which will enable it easily to be spread. It is an object of my invention to provide new and improved means for maintaining such a receptacle at a suitable temperature above that generally prevailing in the storage compartment.

Electrical devices of various types have been used in refrigerator cabinets as, for example, circulating means such as fans for circulating box air through air purifiers or filters. It is another object of my invention to utilize the heat developed by the electric current flowing in such devices to maintain the interior of the butter conditioner or the like at a temperature above that generally prevailing in the refrigerated compartment.

Further objects and advantages of my invention will become apparent as the following description proceeds, and the features of novelty which characterize my invention will be pointed out with particularity in the claims annexed to and forming a part of this specification.

Figure 1:
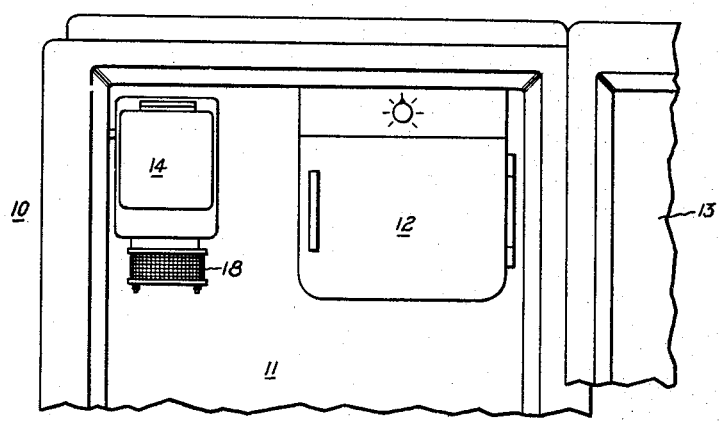
Figure 2:
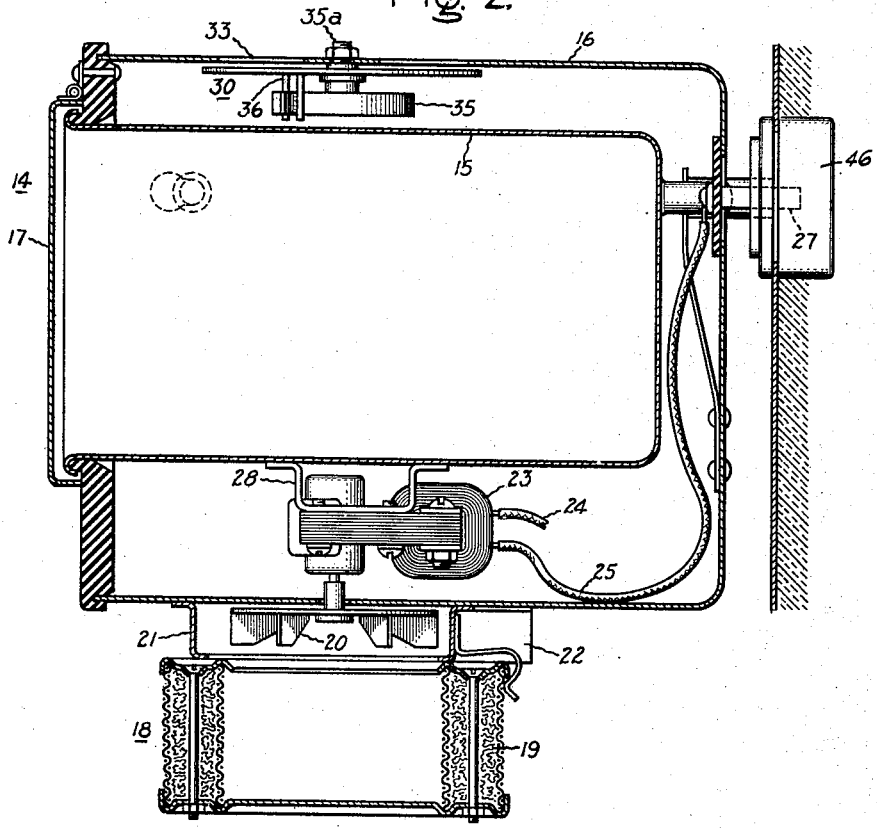

For a better understanding of my invention reference may be had to the accompanying drawings in which Fig. 1 is a front elevational, partial, view of a refrigerator cabinet embodying my invention; Fig. 2 is an enlarged sectional view of the food storage receptacle shown in Fig. 1; Fig. 3 is a top view, partly broken away, of the receptacle shown in Figs. 1 and 2; Fig. 4 is a bottom view of the storage receptacle shown in Figs. 1 to 3, inclusive; Fig. 5 is a partial view, partly in section, of a receptacle such as that shown in Figs. 1 to 4, inclusive, illustrating a second embodiment of my invention; and Fig. 6 illustrates an electric circuit for the operation of the embodiment of my invention illustrated in Fig. 5.

There is illustrated in the drawing a refrigerator cabinet 10 of the domestic type having suitable heat insulated walls defining a food storage compartment 11 arranged to be cooled by a suitable cooling unit or refrigerant evaporator 12 preferably disposed in the upper portion of the compartment 11. A suitable heat insulated door 13 is provided for closing an access opening to the interior of the cabinet 10. In order to maintain butter and the like at a temperature above that generally prevailing in the storage space 11 but usually lower than the temperature prevailing exteriorly of the cabinet, I have provided a receptacle or compartment 14 having suitable thermally insulated walls. The receptacle is provided with means for conducting heat thereto, as hereinafter described, in order that heat may be imparted to the interior of the receptacle.

The receptacle 14 comprises an inner heat conducting liner 15 and an outer liner or shell 16 maintained in spaced relationship with respect to the inner liner, thereby providing a layer of relatively dead air between the liners. There is provided a suitably hinged door or closure member 17 for closing the opening in the front wall of the receptacle. The particular wall construction shown herein is not my invention but is the invention of LaMar S. Cooper and is described and claimed in his copending application Serial No. 386,947, filed April 4, 1941, and assigned to the same assignee as the present invention.

Suitable means has been provided for supporting the compartment or receptacle 14 from the walls of the refrigerator cabinet. Inasmuch as the details of the supporting means illustrated in the drawings are not part of my invention, but are the invention of James L. Knight and are described and claimed in his copending application Serial No. 400,189, filed June 28, 1941, and assigned to the same assignee as my present invention, the details thereof will not be described.

It has been proposed to provide refrigerator cabinets with air purifying units or deodorizing units so that air circulated into association therewith will be sufficiently purified to minimize the conduction of odors to food stored in the refrigerator. Thus, I have shown a deodorizer unit 18 mounted on the lower side of the outer casing of the receptacle and containing a suitable air purifying substance or material 19, such as particles of activated carbon, for example. In order to cause the box air to circulate into association with the particles so that odors and other impurities in the circulating air may be removed thereby. I have provided a fan 20 suitably disposed in a casing 21 for the purpose of drawing air as through an inlet 22 and discharging it into the casing or purifier 18 from whence it will be discharged through the spaces between the particles 19. As is well understood, the engagement of the air with the particles will cause the odors therein to be adsorbed by the particles, the material also serving to filter out other impurities in the air. The details of the purifying unit form no part of my invention and may be varied to suit any particular situation. In order to impart rotary motion to the fan device, I have provided an electric device in the form of a motor 23. Any suitable electric circuit may be provided for conducting electric power to the motor. For example, I may provide leads 24 and 25 terminating in suitable plug type terminals, as indicated by the numerals 26 and 27, respectively, as best seen in Fig. 3, for completing an electric circuit to suitable supply lines.

Means is provided for applying heat to the interior of the receptacle. To this end, the motor 23 is mounted in thermally conductive relationship with the inner shell 15 of the receptacle as by means of one or more suitable brackets 28 of heat conductive material and disposed in thermal relationship with the motor and the inner shell. Thus, it will be apparent that electrical energy dissipated in the motor will be conducted to the receptacle in the form of heat. The foregoing means for supplying heat to the inner shell 15 is not part of my invention but is the invention of Carl F. Scott and is described and claimed in his copending application Serial No. 408,009, filed August 23, 1941, and assigned to the same assignee as my present invention.

I have provided means for regulating the temperature within the compartment defined by the liner 15. In the form of my invention shown in Figs. 2 and 3, there is provided an arrangement for permitting, in selected amounts, the circulation of relatively cool box air into heat exchange relationship with the inner liner 15. There is provided a damper 30 having a plurality of openings 31 and closed portions 32 arranged to cooperate with openings 33 in the outer liner 16. The position of the damper will, of course, determine the amount of communication between the interior and exterior of the outer liner 16. I have illustrated automatic means for determining the position of the damper. In the form illustrated in the drawings, the means takes the form of a coiled bimetallic strip 35 suitably secured at one end as to end of a shaft 35a extending through the damper and the outer shell, the means 35a thereby providing a support not only for the thermostat but also a pivotal support for the damper 31. The free end of the thermostatic element is associated with the damper as, for example, being inserted between a pair of laterally extending members 36, the members being secured at one end to the damper. With this arrangement the damper will be operated responsive to the temperature of the air contained between the liners 15 and 16. Thus, at a predetermined temperature the damper will be in a closed position but as the temperature of the air between the liners becomes too warm, under which conditions the butter would become too soft, the thermostatic strip will begin to unwind, thereby gradually enlarging the opening to the main food storage compartment 11 and therefore permitting circulation of relatively greater amounts of cooled air into heat exchange relationship with the shell 15.

In the form of my invention shown in Figs. 5 and 6, I have provided an auxiliary source of heat in the form of an electric heater 44 and a thermostatic device 37, such as a thermostatically operated switch, for enabling the supply of heat transferred from the heater 44 to the refrigerated compartment to be controlled. The thermostatic device 37 may be of any suitable type. In the diagrammatic arrangement disclosed in Fig. 6, the thermostatically operated switch 37, shown in block form in Fig. 5, comprises a movable contact 38 carried on the free end of a bimetallic element 39 which is secured at the other end thereof to a fixed support 40. The contact 38 is arranged in operative relationship with an adjustable stationary contact 41, adjustment being had by a suitable adjusting device, such as a knob 42 attached to the outer end of an operating rod 43 extending into operative relation with the adjustable contact 41. In this form of my invention the motor 23 operates whenever the electric circuit is complete so that heat is transferred to the inner liner whenever the refrigerator is connected to a source of power.

Normally, the motor device will provide sufficient heat to maintain the butter at the proper consistency. In some circumstances, the amount of heat obtained from the motor will be insufficient to maintain the butter in the receptacle at the desired consistency. For these situations I have provided an additional auxiliary heater element 44 suitably maintained in thermal engagement with the inner liner 15, as by means of a suitable clip 45. As seen in Fig. 6, the heater 44 and the thermostat 37 are connected across the line, that is, in parallel with the motor 23. When the temperature of the bimetallic element is above a predetermined temperature, the contacts are retained in the open position and the circuit to the heater is broken, in which condition the only heat supplied to the butter conditioner is that developed in the motor 23. However, when the temperature of the bimetallic element is below a predetermined temperature, the contacts are moved to the closed position and the branch circuit to the heater 44 is completed, the heat therefrom supplementing the heat of the motor. Thus, the thermostatic switch opens and closes the circuit to the heater 44 as the temperature within the receptacle rises above and falls below a predetermined value.

I have illustrated in Figs. 2 and 3, a suitable terminal block 46 to which power from an external circuit may be conducted and which is provided with suitable terminal elements for association with the plugs 26 and 27. For purposes of illustration in Fig. 6, power is conducted to the refrigerator over suitable lines 47, the lines 47 being connected to the motor device 23 by means of conductors 48 and 49.

Although I have shown a particular embodiment of my invention, modifications will occur to those skilled in the art. For instance, other sources of heat may be disposed within the refrigerated compartment and may be utilized for conducting heat to receptacle. Moreover, other electrical devices which provide heat resulting from operation thereof may be employed for the purposes of my invention instead of the air purifying unit 18. Further, the temperature need not be automatically adjusted but manual means may be provided in order to permit selective adjustment of the temperature. Accordingly, I do not desire my invention to be limited to the particular embodiment of my invention described herein but I intend in the appended claims to cover all modifications within the spirit and scope of my invention.

What I claim as new and desire to secure by Letters Patent of the United States, is:

1. In a refrigerator cabinet having a food storage compartment, means for providing refrigeration in said compartment, a food storage receptacle within said compartment, an electrical device in said compartment, means for conducting the heat incidentally resulting from the operation of said electric device to said receptacle, and means for adjustably providing for the circulation of relatively cool box air into heat exchange relationship with said receptacle.

2. In a refrigerator cabinet having a refrigerated compartment, a refrigerating system for cooling said compartment and a food storage receptacle in said compartment, an electric device disposed in said compartment, means associated with said receptacle for conducting heat incidentally resulting from the operation of said electric device to said receptacle, shielding means substantially enclosing said receptacle for normally maintaining cooled box air out of thermal association with said receptacle, and means associated with said shield for admitting such air into thermal association with said receptacle.

3. In a refrigerator cabinet having a refrigerated compartment, refrigerant circulating means for cooling said compartment, and a food storage receptacle in said compartment, an electric device disposed in said compartment, means associated with said receptacle for conducting heat incidentally resulting from the operation of said device to said receptacle, shielding means substantially enclosing said receptacle for normally keeping cool box air out of thermal association with said receptacle, said shield having an opening therein, closure means for said opening, said closure means being adjustable for controlling the amount of relatively cool box air passing through said opening into heat exchange relationship with said receptacle.

4. In a refrigerator cabinet having a refrigerated compartment, refrigerant circulating means for cooling said compartment, and a food storage receptacle in said compartment, means associated with said receptacle for conducting heat thereto, shielding means substantially enclosing said receptacle for normally keeping cool box air out of thermal association with said receptacle, said shield having an opening therein, closure means for said opening, said closure means being adjustable, and means associated with said closure means and operable according to the temperature of the receptacle for controlling the amount of relatively cool air passing through said opening into heat exchange relation with said receptacle.

5. In a refrigerator cabinet having a refrigerated storage compartment, an electric device and a storage receptacle within said compartment for the storage of butter or the like, means for conducting heat resulting from the operation of said electric device to said receptacle for normally maintaining the temperature therein above the temperature prevailing in the storage compartment, an electric circuit for said device, an additional source of heat comprising electric heating means associated with said circuit and disposed in thermal relationship with said receptacle, and means dependent upon the temperature of said receptacle for connecting said additional source of heat to said circuit.

6. In a refrigerator cabinet having a refrigerated compartment and a storage receptacle for butter and the like, an electric device mounted in thermal association with said receptacle so that the heat resulting from the operation of said device is utilized normally to maintain said receptacle above the temperature prevailing in said storage compartment, an electric circuit for said device, an auxiliary source of heat comprising an electic heater adapted to be connected in said circuit, and thermostatic means responsive to the temperature of said receptacle for connecting said auxiliary source of heat in said circuit under conditions such that the heat supplied by said electric device is insufficient to maintain said receptacle at the desired temperature.

ALBERT F. WILD.